United States Patent [19]

Lakshmanan et al.

[11] Patent Number: 5,478,891
[45] Date of Patent: Dec. 26, 1995

[54] POLYMER COMPOSITIONS

[75] Inventors: P. R. Lakshmanan, Houston; Amir Tayebianpour, League City, both of Tex.

[73] Assignee: IGI Baychem, Inc., Houston, Tex.

[21] Appl. No.: 322,287

[22] Filed: Oct. 13, 1994

Related U.S. Application Data

[62] Division of Ser. No. 155,187, Nov. 22, 1993, Pat. No. 5,397,843.
[51] Int. Cl.$^6$ ............ C08L 23/08; C08L 23/10; C09J 123/10; C09J 123/04
[52] U.S. Cl. ............................. 525/240; 524/528
[58] Field of Search ............................. 525/240, 528

[56] References Cited

U.S. PATENT DOCUMENTS 4,105,718  8/1978  Weemes et al. .
4,761,450  8/1988  Lakshmanan et al. .

FOREIGN PATENT DOCUMENTS 0005896  12/1979  European Pat. Off. .

OTHER PUBLICATIONS

Rifi et al "Flexomer™ Polyolefins"—1990 pp. 1 & 2.

Primary Examiner—Carman J. Seccuro, Jr.
Attorney, Agent, or Firm—Vinson & Elkins

[57] ABSTRACT

Blended polymer compositions are disclosed comprising an admixture of (a) a copolymer of ethylene and an alphaolefin and (b) an amorphous polypropylene, and/or amorphous polyolefin, or mixtures thereof.

8 Claims, No Drawings

POLYMER COMPOSITIONS

This is a division of application Ser. No. 08/155,187, filed Nov. 22, 1993, now U.S. Pat. No. 5,397,843.

FIELD OF THE INVENTION

This invention relates to the field of polymer blends of the type suitable for the preparation of hot melt adhesives, coatings, sealants, as cable floods, for modifying asphalt or bitumens and as additives for plastics. More specifically, the invention relates to blended polymer compositions comprising (a) a copolymer of ethylene and an alphaolefin and (b) an amorphous polypropylene, or amorphous polyalphaolefin, or mixtures thereof.

BACKGROUND OF THE INVENTION

Conventional amorphous polypropylenes, also known as "atactic polypropylenes" or "APP" are polymers which have been known and used for many years. They are tacky solid (at room temperatures), low molecular weight polymers having a low to very low level of crystallinity. Atactic polypropylenes originally were produced as undesired byproducts of the commercial production of isotactic polypropylene via the hydrocarbon solution or slurry processes, utilizing earlier versions of stereospecific catalysts. Although not the target products of those processes, APP nevertheless found commercial markets in such fields as adhesives, coatings, sealants, plastics, and asphalt or bitumen modifiers.

In recent years, commercial processes for the production of isotactic polypropylene have undergone improvement through advances in process technology and the availability of improved catalysts. The result has been improved selectivity of the processes and, concomitantly, reduced or eliminated production of the APP byproduct. At the same time, demand for an equivalent APP product has been rising as a result of increased commercial applications of the product. The result has been the development of various technologies for the intentional production of APP as a primary product. Intentional production technologies make possible tailored characteristics of the APP product to confer various properties. Intentionally produced versions of APP now is available as a homopolymer, copolymer or terpolymer and in a variety of molecular weight ranges. The terms "amorphous polyolefins" and "amorphous polyalphaolefins" often are used interchangeably to describe this new class of intentionally produced amorphous polypropylenes (homo-, co- and terpolymers). Since the method of production does not affect the nature or utility of the APP or APO product, as used herein, "amorphous polypropylene" and "APP" shall include both the byproduct and intentionally produced amorphous polypropylenes, while "amorphous polyolefin" and "APO" shall refer to amorphous polyolefins generally, including, amorphous polypropylene, as well as homo-, co- and terpolymers of amorphous polyolefins, regardless of whether produced as byproducts or by intent.

Polymer modifications of amorphous polypropylene, however produced, with various modifiers such as isotactic polypropylene, ethylene-propylene copolymer, polybutylene and low-density polyethylene, solely or in combination with other additives, are known in the prior art and have been utilized in the preparation of various compositions of commercial interest. See, for example, prior art patents U.S. Pat. Nos. 4,143,858; 3,900,694; 3,798,118; 4,826,909; and 4,761,450. However, the prior art has not suggested similar modification of amorphous polypropylenes or amorphous polyolefins with ethylene-alphaolefin copolymers of the type described herein.

SUMMARY OF THE INVENTION

In accordance with the present invention, it has been discovered that modification of amorphous polypropylene, amorphous polyolefins, or mixtures thereof by blending therewith a copolymer of ethylene and alphaolefins selected from an olefin group consisting of 1-butene, 1-hexene, 1-octene and higher alphaolefins produces a blended polymer composition of improved bulk properties and having enhanced toughness, elongation, hardness and flexibility properties over the unmodified amorphous polypropylene. Such polyblend compositions produced in accordance with the present invention are suitable for use as starting intermediates for the preparation of such compositions as hot melt adhesives, sealants and various coating compositions, as well as for the modification of bitumen (including asphalts) to impart composition integrity, improved tensile properties and improved cold temperature flexibility. The ethylene-alphaolefin polymer modified amorphous polyolefin produced in accordance with the present invention can, if needed, be further modified with tackifiers, waxes, low molecular weight polybutenes, process oils, asphalt and bitumen of various grades, rubbers, ethylene-vinyl acetate and ethylene-acrylate copolymers, etc., to provide a range of products to function as adhesives, sealants, coatings, cable flood materials, waterproof membranes and as modifiers or flexibilizers for asphalt and bitumen. Modified amorphous polyolefin compositions in accordance with the present invention also can be utilized as carriers for pigments and colorants and other additives for the preparation of specific master batches or let down in other high molecular weight polymers to make various filled and colored plastic objects as well as to provide other benefits such as antislip, antistatic and other properties.

It is, accordingly, the primary object of the present invention to provide novel blended polymer compositions comprising amorphous polypropylene, amorphous polyolefin, or mixtures thereof, modified by the addition of various ethylene-alphaolefin copolymers to produce a uniform homogeneous blended polymer product exhibiting improved bulk integrity in the solid form.

A further object of the present invention is to demonstrate that the blending of polymers in accordance with the present invention produces a compatible blended polymer composition as evidenced by observed changes in viscosity, clarity in the molten state and overall physical integrity of the composition upon solidification to room temperature.

A still further object of the present invention is to show that unexpected benefits result from modification of the amorphous polypropylene/polyolefin with the ethylene-alphaolefin copolymer, such as improved cold temperature properties, without compromising the hardness quality of the composition. The ability to have these incorporated features in amorphous polypropylene/polyolefin polymer compositions will enhance their usefulness in applications areas such as coatings, sealants, adhesives, cable floods, asphalt and bitumen modification and polymer additives.

DETAILED DISCLOSURE

The disclosed novel blends which are useful as polymer intermediates for the preparation of hot melt adhesives, coatings, sealants, cable flood, asphalt and bitumen modifiers and as plastic additive comprise (a) a copolymer of ethylene and alphaolefin, the alphaolefin content of at least 5 weight percent or more of the copolymer and being selected from the group consisting of 1-butene, 1-hexene, 1-octene and higher olefins and (b) an amorphous polypropylene, amorphous polyolefin, or mixtures thereof.

The copolymers of ethylene and alphaolefin used herein, are high molecular weight polymers, generally rigid at room temperatures, but easily formable when heated. The alpha-olefin contained in the copolymer is selected from the group of 1-butene, 1- hexene, 1-octene and higher 1-olefins and is present at a concentration of at least 5% by weight, and preferably 10% or more by weight. The ethylene-alphaolefin copolymers have a preferred melt index, determined in accordance with ASTM D1238 or its adaptations, of about 0.5 to 2,000 or more g/10 min and a density of about 0.92 g/cc or below and, preferably, less than 0.90. One such ethylene-alphaolefin copolymer is commercially offered under the trade name "Flexomet" from Union Carbide. Flexomet 9042 is a copolymer of ethylene and 1-butene, of approximate 1-butene content of 15 weight percent. This polymer has a 0.900 g/cm$^3$ density, a melt index of 5.0 and a crystallinity level of about 26%. Like ethylene-alphaolefin products are commercially available from Exxon as "Exact" polymers, while Dow, and others, have similar products produced via metallocene catalyst chemistry.

The other component of the novel composition claimed herein are amorphous (atactic) polypropylenes, including amorphous polyolefins, amorphous polyalphaolefins, and combinations thereof, which exhibit varying extents of solubility in hydrocarbon solvents, such as pentane, hexane, etc., have a crystallinity of less than about 20 weight percent, preferably less than about 10 weight percent and possess a molecular weight in the range of about 300 to about 60,000, preferably about 1,000 to about 25,000. The method used in preparing the amorphous polypropylene or amorphous polyolefins and recovering the same, has no effect on its utilization in the preparation of the novel polymer blends claimed herein. Thus, amorphous polypropylene formed as a byproduct during the production of crystalline polypropylene (homo or copolymer resins) by the polymerization of propylene in the presence of stereospecific catalysts by processes disclosed, for example, in U.S. Pat. Nos. 3,679, 775 to Hagemeyer, et al., 3,529,037 also to Hagemeyer, et al. and 3,900,694 to Jurrens can be used. On the other hand, amorphous polypropylene (or other amorphous polyolefins) produced directly, that is, by intent, without the co-production of crystalline copolymers of propylene and other olefins, as disclosed, for example, in U.S. Pat. Nos. 3,923,758 to Carter, et al.; 3,954,697 to McConnell, et al.; 4,072,812 to McConnell, et al.; 4,072,813 to McConnell, et al.; 4,259,470 to Trotter, et al.; 4,309,522 to Dietrich, et al.; and 4,317,897 to Hermann, et al.; 4,276,191 to Karayannis, et al., and products of the process of U.S. Pat. Nos. 4,736,002 to Allen, et al.; 4,847,340, also to Allen, et al.; 4,859,757 to Pellon, et al.; 4,826,939 to Stuart, Jr.; and European Application No. 87400168.8 to Smith, et al.; also can be used. While the amorphous polypropylenes (amorphous polyolefins) used herein can be homopolymers of propylene, it is within the purview of the present invention also to use substantially amorphous products based on propylene copolymerized with olefins, such as ethylene, butene, pentene, hexene, octene, nonene, decene, etc., whether such products have been obtained intentionally or as byproducts. Such copolymers of propylene and other olefins are defined herein as being included within the broader group of "amorphous polyolefins." Such amorphous copolymers can have a melt viscosity in the range of about 200 to about 200,000 cps, or even higher at 375° F. (190.5° C.) (ASTM D3236). These copolymers will contain propylene in an amount ranging from about 25 to 99.5, or even higher, weight percent, generally from about 50 to about 99.5, or even higher, weight percent, with the remainder being one or more of the other olefins identified above.

The two components of the novel compositions claimed herein preferably are present in the following amounts:

|  | Weight Percent | |
| --- | --- | --- |
|  | Broad Range | Preferred Range |
| ethylene-alphaolefin copolymer | 2.5–95 | 10–90 |
| amorphous polypropylene, amorphous polyolefin, or mixtures thereof | 97.5–5 | 90–10 |

Since compositions tend to experience varying degrees of thermal exposure during thermal processing, it is desirable to incorporate therein one or more antioxidants in small amounts to inhibit thermal and/or thermoxidative degradation. Several commercial products, predominantly of the hindered phenol types, are available for this purpose to function as primary antioxidants. A secondary antioxidant belonging to the general classification of thioesters and phosphites also can be used in combination with the hindered phenols. Examples of antioxidants suitable for use herein include tetrakis (methylene 3-( 3',5'-di-t-butyl-4 hydroxyphenyl)pro-pionate)methane; 2,2'-ethyldenebis (4,6-di-tertiarybutylphenol); 1,1-3-tris (2-methyl-4-hydroxy-5-t-butylephenyl) butane; and 1,3,5-trimethyl 2,4,6, tris (3,5-tertbutyl-4-hydroxybenzyl)benzene. Secondary antioxidants such as dilaurylthiodipropionate; pentaerythritol tetrakis (beta-laurylthiopropionate) and various alkyl-, aryl,di- and polyphosphites and thiophosphites also can be employed in combination with appropriate hindered phenols. Effective amounts of antioxidants range from about 0.05 to about 5 weight percent, preferably from about 0.1 to about 2.5 weight percent, based on the weight of the final polyblend coinposition.

EXAMPLES

The preparation of the polymer blend compositions claimed herein is not critical and any suitable method may be employed. In the preferred embodiment, used in the examples discussed below, a mixing vessel, such as a sigma blade mixer, was heated to an elevated temperature, for example in the range of about 350° F. (177° C.) to about 400° F. (204.5° C.) and the amorphous polypropylene, amorphous polyolefin, etc. was added to the mixing chamber, along with the antioxidant(s). A 600 ml capacity mixing chamber was utilized, with a $N_2$ blanketing sufficient to provide about 400 gm of the mixed (final) composition. The amorphous polypropylene mass was allowed to soften, at which point the mixing was commenced under slow blade speed. When the antioxidant was thoroughly mixed in the molten mass, slow addition of the ethyleneoalphaolefin copolymer was initiated in small quantities, and the material is worked into the entire mass before the addition of further quantities. Following the completion of the polymer addition, mixing was continued for a sufficient period of time to assure a well mixed homogeneous mass, which then was collected in a release lined tray. Typically the entire mixing schedule required about two to four hours.

The following test methods were used in analyzing the experimental results illustrated in the accompanying tables:

Viscosity

Composition melt viscosity was determined according to ASTM D3236 procedure employing Brookfield Thermosel Unit. A quantity of the material to be tested, i.e., about 8 to 13 grams, was placed in the sample chamber of the viscosimeter and heated to reach the desired test temperature. Then the spindle of the viscosimeter was lowered into the molten sample mass and equilibrated for a period of time to condition the mass temperature to the desired test temperature. The viscosity of the molten sample at the temperature of desire was obtained from the scale reading, employing the necessary instrument factor for the appropriate spindle and speed employed.

Ring & Ball

This property was determined according to ASTM D36 or E28 procedure.

Needle Penetration

This property was determined according to the ASTM D5 or D1321 procedure.

Breaking Temperature (Low Temperature Flexibility) A 4 mm thick, 16"×18" sheet of the polymer composition was cast in a tray of similar dimensions by pouring a 500 g molten stream of the composition. The melt surface was smoothed and allowed to cool. Strip samples of 2"×5" dimensions were cut, which were then conditioned in a freezer set at 0° C. A 1" diameter mandrel device also was conditioned in the freezer at the same temperature. After equilibration of the sample at the set temperature for a period of at least 2 hours, the strips were bent on the cold mandrel at a uniform bending rate over a 2-5 second period. If no failure was observed, the temperature was lowered in increments of 5° C. and the procedure was repeated, until a temperature of failure was established. For failures occurring between the incremental increase temperatures, the actual temperature was established via lowering the temperature by 1° C. increments from the previous pass temperature. A set of three samples was subjected to this test at or near the failure temperature to obtain the average.

Table I

Table I shows a series of runs depicting examples of amorphous polypropylene modified with ethylene-alphaolefin copolymer, prepared as disclosed above. Examples 1 and 2 illustrate tests done on control samples of, respectively, amorphous polypropylene available from IGI Baychem, Inc. under the designation "K-TAC 100," a byproduct APP homopolymer of melt viscosity of about 1,000 cps at 375° F. (190.5° C.) and amorphous polyolefin homopolymer available from Eastman Chemicals under the trade designation "Eastoflex P1023," a by-intent produced amorphous homopolymer of propylene having a viscosity of about 2,500 cps at 375° F. (190.5° C.). Examples 3 and 4 illustrate the effect of modifying a typical byproduct amorphous polypropylene with, respectively, 10% and 20% by weight of ethylene-alphaolefin copolymer comprising approximately 85% by weight ethylene and 15% by weight of 1-butene. The test results show substantially improved viscosities and cold temperature flexibility (Examples 3 and 4) and increased hardness (decreasing needle penetration, Example 4). The compositions of Examples 3 and 4 also exhibited overall compatibility and showed improvement in bulk integrity over the unmodified amorphous polypropylene.

The compositions of Examples 3 and 4 are of interest as coatings, sealants, and adhesive intermediates as well as for the modification of asphalt and bitumen, such as for paving and waterproofing membrane applications.

In Example 5, the intentionally made amorphous polypropylene homopolymer of Example 2 was modified with 20% by weight of the same ethylene-alphaolefin copolymer. The resulting composition (5) again showed increased viscosity, improved hardness and low temperature flexibility. Such compositions are of interest as adhesive, sealant and coating intermediates, as well as for the modification of asphalt and bitumen.

Table II

Table II presents, in Example 6, control tests on an amorphous polyolefin copolymer available from Eastman Chemicals under the trade designation "Eastoflex E1060." It is an amorphous copolymer of propylene and ethylene containing about 15–20 weight percent ethylene and having a melt viscosity of about 6,000 cps at 375° F. (190.5° C.).

Example 7 of Table II shows the effect of incorporating an increased level of ethylene-alphaolefin copolymer (50 weight %) in an intentionally made amorphous polypropylene. See also Example 5, Table I (control). Such higher levels of the ethylene-alphaolefin copolymer showed further improvement in low temperature flexibility, hardness and increase in viscosity, as shown by comparing Example 7 with Example 5.

The bulk integrity of the prepared composition was still better than the composition which was prepared at the lower level of 20% by weight of the ethylene-alphaolefin copolymer. Compare Example 7 of Table II with Example 5 of Table I.

Similar modification of an intentionally made amorphous propylene ethylene copolymer (Eastoflex E1060) was carried out with the same ethylene-alphaolefin copolymer at 20% and 50% levels, Examples 8 and 9. The viscosities of the modified compositions were considerably enhanced over the unmodified material, shown by comparing Examples 8 and 9 with Example 6. Improvement in compositional hardness and low temperature property resulted as a consequence of this modification.

The compositions of Examples 7, 8 and 9 are also of interest as intermediates for the preparation of coatings, adhesives, sealants compositions and for the modification of asphalt and bitumen.

TABLE I

Ethylene-Butene Copolymer Modification of
Amorphous Polypropylene and Amorphous Polyolefin

| | Example | | | | |
|---|---|---|---|---|---|
| | 1 | 2 | 3 | 4 | 5 |
| Composition | | | | | |
| Amorphous Polypropylene (APP)[1] | 100 | — | 90 | 80 | — |

TABLE I-continued

Ethylene-Butene Copolymer Modification of
Amorphous Polypropylene and Amorphous Polyolefin

| | Example | | | | |
|---|---|---|---|---|---|
| | 1 | 2 | 3 | 4 | 5 |
| Amorphous Polyolefin, Homopolymer (APO)[2] | — | 100 | — | — | 80 |
| Ethylene-Butene Copolymer[3] | — | — | 10 | 20 | 20 |
| Isonox 129/DLTDP (1:1)(antioxidant) | — | — | 0.4 | 0.4 | 0.4 |
| Properties | | | | | |
| Viscosity[4] [cps at 375° F. (190.5° C.)] | 1,200 | 2,275 | 2,100 | 4,100 | 5,100 |
| Ring & Ball[5] [°F. (°C.)] | 308 (153.3) | 306 (152.2) | 306 (152.2) | 308 (153.3) | 308 (153.3) |
| Needle Penetration[6] [dmm at 77° F. (25° C.)] | 29 | 16 | 29 | 25 | 13 |
| Breaking Temperature, °C. | −8 | −9 | −13 | −14 | −10 |

[1] K-TAC 100 (IGI Baychem, Inc.) Byproduct APP, typical melt viscosity 1,000 cps at 375° F. (190.5° C.); R & B 305° F. (151.6° C.)
[2] Eastoflex P1023 (Eastman Chemicals) By intent APP homopolymer, typical melt viscosity 2,500 cps at 375° F. (190.5° C.); R & B 302° F. (150° C.)
[3] Flexomer ™ 9042, 15% Butene, 5 g/10 min, melt index
[4] ASTM D3236
[5] ASTM D36
[6] ASTM D5

TABLE II

Ethylene-Butene Copolymer Modification of
Amorphous Polyolefins

| | Example | | | |
|---|---|---|---|---|
| | 6 | 7 | 8 | 9 |
| Composition | | | | |
| APO Homopolymer[1] | — | 50 | — | — |
| APO Copolymer[2] | 100 | — | 80 | 80 |
| Ethylene-Butene Copolymer[3] | — | 50 | 20 | 50 |
| Isonox 129/DLTDP (1:1)(antioxidant) | — | 0.4 | 0.4 | 0.4 |
| Properties | | | | |
| Viscosity[4] [cps at 375° F. (190.5° C.)] | 5,750 | 46,000 | 13,500 | 72,000 |
| Ring & Ball[5] [°F. (°C.)] | 275 (135) | 312 (155.5) | 280 (137.78) | 269 (131.66) |
| Needle Penetration[6] [dmm at 77° F. (25° C.)] | 37 | 8 | 30 | 18 |
| Breaking Temperature, °C. | −25 | −21 | −32 | <−35 |

[1] Eastoflex P1023 (Eastman Chemicals)
[2] Eastoflex E1060 (Eastman Chemicals), propylene-ethylene copolymer, APO typical melt viscosity 6,000 cps at 375° F. (190.5° C.); R & B 275° F. (135° C.)
[3] Flexomer ™ 9042, 15% Butene, 5 g/10 min, melt index
[4] ASTM D3236
[5] ASTM D36
[6] ASTM D5

TABLE III

Comparative Performance of Amorphous Polypropylene (APP)
Modified with IPP, E-P Copolymer and
Ethylene-Butene Compolymer

| | Example | | | |
|---|---|---|---|---|
| | 10 | 11 | 12 | 13 |
| Composition | | | | |
| Amorphous Polypropylene | 100 | 90 | 90 | 90 |
| Ethylene-Butene Copolymer[1] | — | 10 | — | — |
| Ethylene-Propylene Colpolymer[2] | — | — | 10 | — |
| Isotactic Polypropylene[3] | — | — | — | 10 |
| Isonox 129/DLTDP (1:1)(antioxidant) | — | 0.2 | 0.2 | 0.2 |
| Properties | | | | |
| Viscosity[4] [cps at 375° F. (190.5° C.)] | 1,400 | 2,150 | 5,500 | 9,250 |
| Ring & Ball[5] [°F. (°C.)] | 311 (155) | 311 (155) | 307 (152.7) | 319 (159.4) |
| Needle Penetration[6] [dmm at 77° F. (25° C.)] | 28 | 26 | 17 | 15 |
| Breaking Temperature, °C. | −14 | −16 | −11 | −9 |

[1] Flexomer ™ 9042, 15% Butene, 5 g/10 min, melt index
[2] 6.0% ethylene, 5 g/10 min, melt flow
[3] 3 g/10 min, melt flow
[4] ASTM D3236
[5] ASTM D36
[6] ASTM D5

Table III

In Table III is shown the desirability of utilizing the preferred ethylene-alphaolefin copolymer (Flexomet 9042) for the modification of amorphous polypropylene, over prior art modifiers such as isotactic polypropylene (IPP) homopolymer or an ethylene-propylene (EP) copolymer.

As shown in Examples 11, 12, and 13 of Table III, the modification of amorphous polypropylene with either IPP or an EP copolymer produces less improvement in the low temperature property than does the ethylene-alphaolefin copolymer modified composition, despite levels higher of viscosification with these prior art polymer modifiers. Also from comparing Examples 11 and 10, it is seen that only the ethylene-alphaolefin copolymer improves the low temperature property of the amorphous polypropylene while also imparting higher compositional viscosity to the blended product.

TABLE IV

Example of Caulk/Sealant Intermediate

| | Example | |
|---|---|---|
| | 14 | 15 |
| Composition | | |
| APO Homopolymer[1] | 40 | 60 |
| Ethylene-Butene Copolymer[2] | 10 | 15 |
| Low Molecular Weight Polybutene[3] | 50 | 25 |
| Isonox 129/DLTDP (1:1)(antioxidant) | 0.2 | 0.2 |
| Properties | | |
| Viscosity[4] [cps at 375° F. (190.5° C.)] | 1,050 | 2,200 |
| Ring & Ball[5] [°F. (°C.)] | 296 (146.6) | 304 (151.1) |
| Needle Penetration[6] [dmm at 77° F. (25° C.)] | 51 | 35 |

[1]Eastoflex P1023 (Eastman Chemicals)
[2]Flexomer ™ 9042 (Union Carbide Chemicals & Plastics)
[3]Indopol H-1500 (Amoco Chemicals Co.), Liquid Polybutene, M.W. $\overline{Mn}$ = 2160.

TABLE IV-continued

Example of Caulk/Sealant Intermediate

| | Example | |
|---|---|---|
| | 14 | 15 |

[4]ASTM D3236
[5]ASTM E28
[6]ASTM D1321

Table IV

Table IV illustrates application of the invention to the preparation of intermediate(s) for caulk and sealant applications. Modified polymer blends designed to function as caulk and sealant intermediates were prepared from the exemplary composition of Example 5, Table I in the following manner:

Polymer blend compositions comprising an amorphous polypropylene homopolymer, ethylene-alphaolefin copolymer and a low molecular weight liquid polybutene was melt mixed in a Brabender sigma blade mixer in the weight percent compositions shown in Examples 14 and 15, Table IV. The ingredients were combined and fluxed at 375° F. for about 2 hours to effect solubilization and homogenization.

Upon cooling, the obtained compositions yielded soft products with viscosities of 1,050 cps at 375° F. (Example 14) and 2,200 cps at 375° F. (Example 15).

Such compositions can be further admixed with various levels of mineral fillers of the type such as $CaCO_3$, talc, etc., along with other appropriate additives to function as caulk or sealant.

TABLE V

Exemplary Hot Melt Adhesive Compositions
Based on Ethylene-Butene Copolymer Modified Amorphous Polyolefin

| | Example | | | | | |
|---|---|---|---|---|---|---|
| | 16 | 17 | 18 | 19 | 20 | 21 |
| Composition | | | | | | |
| APO, Homopolymer[1] | 34 | 51 | 33 | — | 52.8 | — |
| APO, Copolymer[2] | — | — | — | 33 | — | 52.8 |
| Ethylene-Butene Copolymer[3] | 8.5 | 12.75 | 33 | 33 | 13.2 | 13.2 |
| $C_5$ Hydrocarbon Resin[4] | 15 | 15 | 34 | 34 | 34 | 34 |
| Low Molecular Weight Polybutene[5] | 42.5 | 21.25 | — | — | — | — |
| Isonox 129/DLTDP (1:1)(antioxidant) | 0.2 | 0.2 | 0.2 | 0.2 | 0.2 | 0.2 |
| Properties | | | | | | |
| Viscosity[6] [cps at 375° F. (190.5° C.)] | 750 | 1,450 | 15,250 | 27,250 | 1,750 | 4,000 |
| Ring & Ball[7] [°F. (°C.)] | 294 (145.5) | 299 (148.3) | — | — | 302 (150) | 262 (127.7) |
| Needle Penetration[8] [dmm at 77° F. (25° C.)] | 66 | 33 | — | — | 11 | 40 |
| Adhesion, 30# Kraft Assembly | Fiber Tear | Fiber Tear | Fiber Tear | Fiber Tear | Fiber Tear | Fiber Tear |

[1]Eastoflex P1023 (Eastman Chemicals)
[2]Eastoflex E1060 (Eastman Chemicals)
[3]Flexomer ™ 9042 (Union Carbide Chemicals & Plastics)
[4]Wingtac 95 (Goodyear Chemicals), $C_5$ hydrocarbon resin; R & B softening point 95° C.
[5]Indopol H-1500 (Amoco Chemicals)
[6]ASTM D3236
[7]ASTM E28
[8]ASTM D1321

Table V

To further exemplify the utility of the ethylene-alphaolefin copolymer modified amorphous polypropylene or poly-alphaolefins, various compositions, as depicted in Table V, Examples 16 through 21, were prepared and evaluated for their adhesion to paper.

In the examples shown, the identified ingredients in the indicated weight percent amounts were melt mixed in a Brabender sigma blade mixer, by combining them in the mixer at 375° F. and fluxed to a homogenized state (about 2 hours).

The various indicated compositions were then evaluated as adhesive, for example, to prepare paper to paper construction. This was done by applying the individual composition held in a molten state (375° F.) by heating a 10 g quantity of the prepared mixture to the indicated temperature with a coating device such as a 3" wide Bird applicator to provide a 1½–2 mil thick adhesive coating. The molten material was poured in the center of a 9"×12" Kraft sheet (30 lbs/ream), along the edges of a heated Bird applicator. The applicator was then drawn down in a smooth manner to yield a uniform thickness adhesive layer.

Upon the deposition of the coating, a strip of paper 2"×4" was pressed across the coated sheet under light uniform pressure via a rubber roller. The assembly was left to cool overnight at room temperature. The quality of adhesion was then checked through debonding of the prepared assembly. The assemblies provided fiber tearing bond.

TABLE VI

Ethylene-Butene Copolymer Modified Amorphous Polyolefins Performance in Filled Bitumen System

| | Example | | | |
|---|---|---|---|---|
| | 22 | 23 | 24 | 25 |
| Composition | | | | |
| Bitumen AC-20[1] | 60 | 60 | 60 | 60 |
| APO, Homopolymer[2] | 25 | — | — | — |
| APO, Colpolymer[3] | — | — | 25 | — |
| Example 5, Table I | — | 25 | — | — |
| Example 8, Table II | — | — | — | 25 |
| Filler (CaCo$_3$) | 15 | 15 | 15 | 15 |
| Properties | | | | |
| Viscosity[4] [cps at 375° F. (190.5° C.)] | 650 | 1650 | 900 | 2600 |
| Ring & Ball[5] [°F. (°C.)] | 287 (141.6) | 278 (136.6) | 249 (120.5) | 243 (117.2) |
| Needle Penetration[6] [dmm at 77° F. (25° C.)] | 32 | 28 | 56 | 41 |
| Breaking Temperature, °C. | −10 | −12 | −15 | <−18 |

[1]Needle Penetration, 70–100 dmm at 77° F. (25° C.), Ring & Ball 100° F.–110° F. (37.7° C.–43.3° C.)
[2]Eastoflex P1023 (Eastman Chemicals)
[3]Eastoflex E1060 (Eastman Chemicals)
[4]ASTM D3236
[5]ASTM D36
[6]ASTM D5

Table VI

In examples 22–25, Table VI, the utility of the various ethylene-alphaolefin modified amorphous polyalphaolefins for use with bitumen was demonstrated.

A Silverson high shear mixer was employed to prepare and evaluate the control and example compositions. A quantity of the bitumen as indicated in the recipe shown in Table VI, sufficient to make a 500 g final mix, was weighed and heated in a quart tin can to a temperature of 375 ° F., at which point sufficient amount of the polymer composition per the recipe was dissolved in the molten bitumen under shear in small quantities. Following the completion of addition of the composition, mixing was continued to a homogeneous stage. This took about 2 to 2½ hours. At this juncture, the requisite amount of CaCO$_3$ (filler) was added in a portion wise manner until the completion of addition and mixing continued to homogeneity. This took an additional 30 minutes.

The mixture was then transferred to a container and then stored. Samples from the prepared compositions were then utilized to perform various indicated tests.

Comparing the results of Example 23 with Example 22 in Table VI, it is seen that the ethylene-alphaolefin modified, amorphous polyalphaolefin provides a filled bitumen composition with higher viscosity, harder products with better low temperature properties than a similar composition prepared from an unmodified polymer, i.e., which did not contain the preferred ethylene-alphaolefin modifier.

Likewise, when a copolymer amorphous polyalphaolefin is utilized, Examples 24 and 25, its performance with bitumen and filler is better when the ethylene-alphaolefin copolymer is also present (Example 25). Again higher viscosity, harder product with better low temperature properties is obtained with the invention composition over the unmodified product with the starting amorphous polyalphaolefin copolymer.

The foregoing disclosure and description of the invention are illustrative only, and various changes in the ingredients, proportions, and other details of the processes and compositions described may be made, within the scope of the appended claims, without departing from the spirit of the invention.

What is claimed is:

1. A composition of matter comprising:

(1) from about 50% to about 95% by weight of a blended copolymer, said blended copolymer comprising from about 2.5% to about 80% by weight of a first component comprising an at least partially crystalline ethylene-alphaolefin copolymer, said alphaolefin having four or more carbons and said copolymer having a specific density of less than 0.90 g/cm$^3$ and from about 20% to about 97.5% by weight of a second component selected from a group consisting of amorphous propylene homopolymer, amorphous propylene-alphaolefin copolymer and admixtures thereof; and (2) from about 50% to about 5% by weight polybutene, said composition containing less than 10% by weight of a crystalline propylene polymer.

2. A hot melt adhesive composition comprising an admixture of:

from about 2.5% to about 80% by weight of a first component comprising an at least partially crystalline ethylene-alphaolefin copolymer, said alphaolefin having four or more carbons, and said copolymer having a specific density of less than 0.90 g/cm$^3$;

from about 20% to about 97.5% by weight of a second component selected from a group consisting of amorphous propylene homopolymer, amorphous propylene-alphaolefin copolymer and mixtures thereof;

a tackifier; and polybutene, said composition containing less than 10% by weight of a crystalline propylene polymer.

3. A hot melt adhesive composition according to claim 2 wherein said first component comprises from about 5% to about 45% by weight of said adhesive composition, said second component comprises from about 10% to about 90% by weight of said composition, said tackifier comprises from about 5% to about 45% by weight of said composition; and said polybutene comprises from about 5% to about 45% by weight of said composition.

4. The composition according to claim 1 comprising additionally a mineral filler.

5. The composition according to claim 1 wherein said blended copolymer comprises from about 3% to about 35% by weight of said ethylene-alphaolefin copolymer.

6. The composition of matter according to claim 1 wherein said blended copolymer comprises from about 20% to about 90% by weight of said second component.

7. The composition according claim 2 wherein said ethylene-alphaolefin copolymer comprises a copolymer of ethylene and 1-butene.

8. The composition according to claim 2 wherein said second component is amorphous polypropylene.

* * * * *

UNITED STATES PATENT AND TRADEMARK OFFICE
CERTIFICATE OF CORRECTION

PATENT NO. : 5,478,891

DATED : December 26, 1995

INVENTOR(S) : Lakshmanan et al

It is certified that error appears in the above-identified patent and that said Letters Patent is hereby corrected as shown below:

Column 3, line 16, "Flexomet" should read --Flexomer--.
Column 3, line 17, "Flexomet" should read --Flexomer--.
Column 4, line 57, "ethyleneoalphaolefin" should read --ethylene-alphaolefin--.
Column 7, table II, line 36, Example 9, "80" should read --50--.

Signed and Sealed this

Eleventh Day of June, 1996

Attest:

BRUCE LEHMAN

*Attesting Officer*     *Commissioner of Patents and Trademarks*